May 12, 1970 — R. A. NEWPORT — 3,511,025
CAPPING APPARATUS
Filed April 14, 1967 — 7 Sheets-Sheet 1
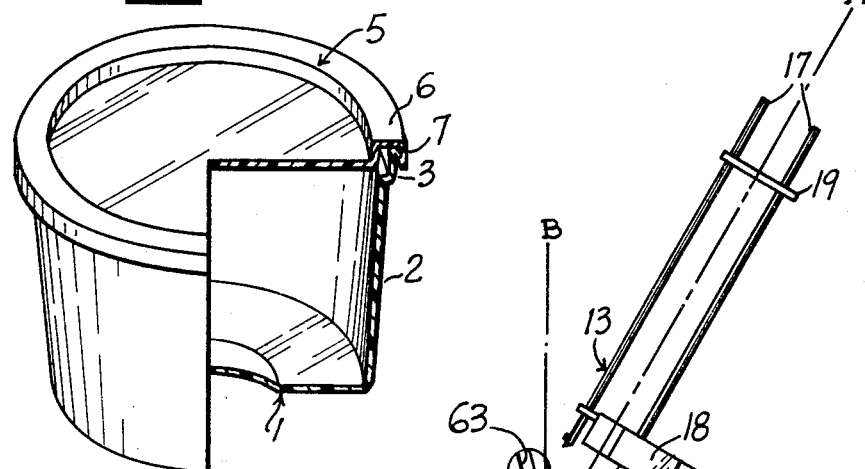
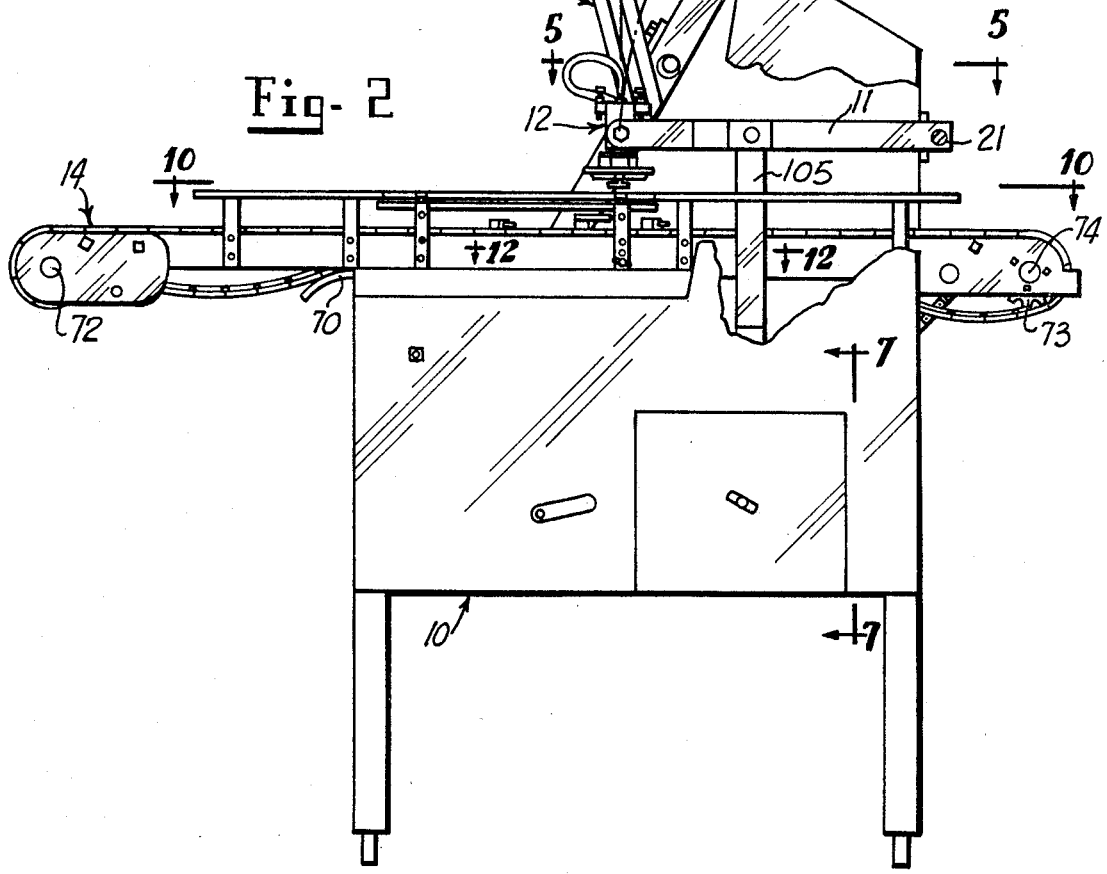
INVENTOR.
RICHARD A. NEWPORT
BY
ATTYS.

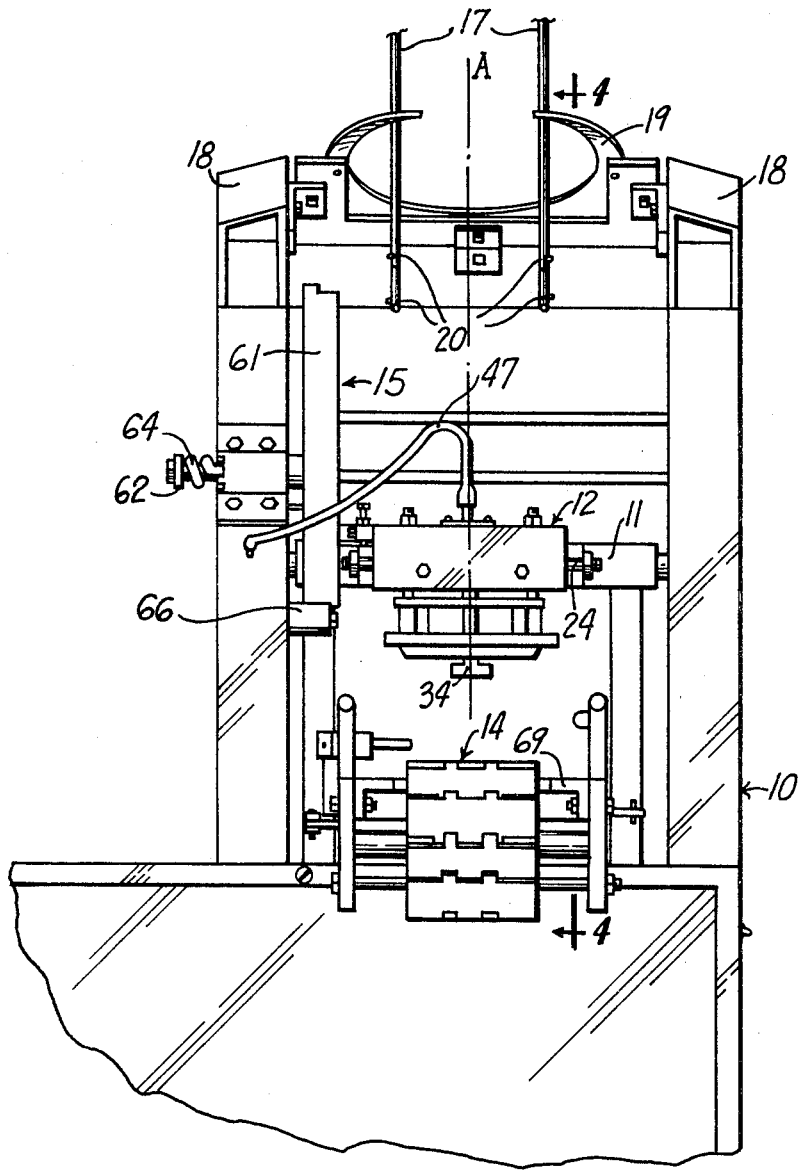

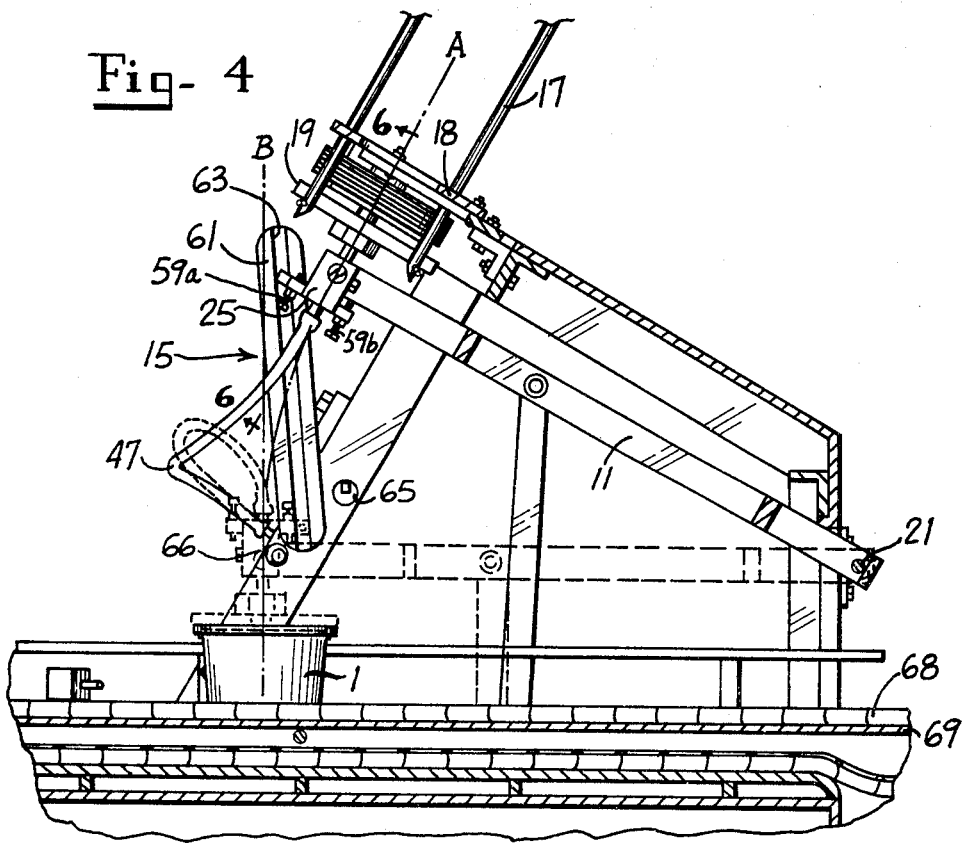

INVENTOR.
RICHARD A. NEWPORT
BY
Wells & St. John
ATTYS.

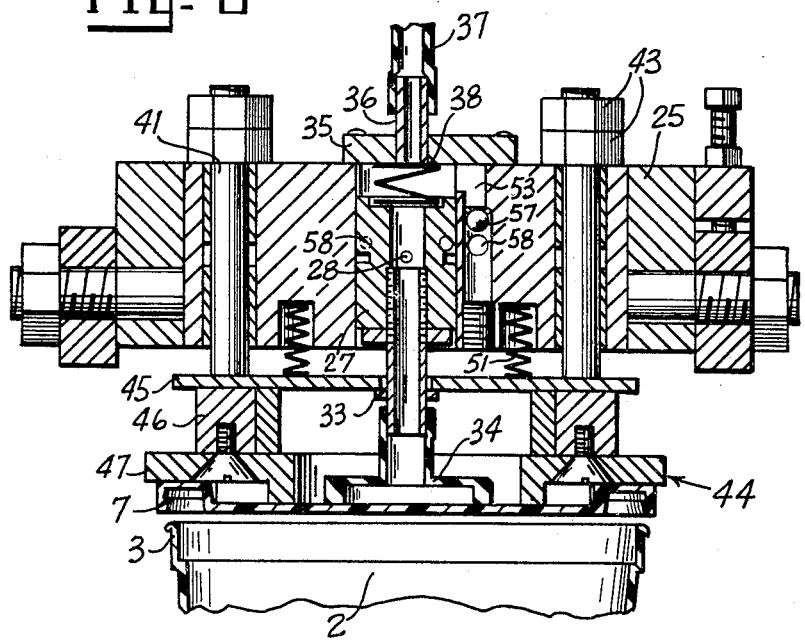
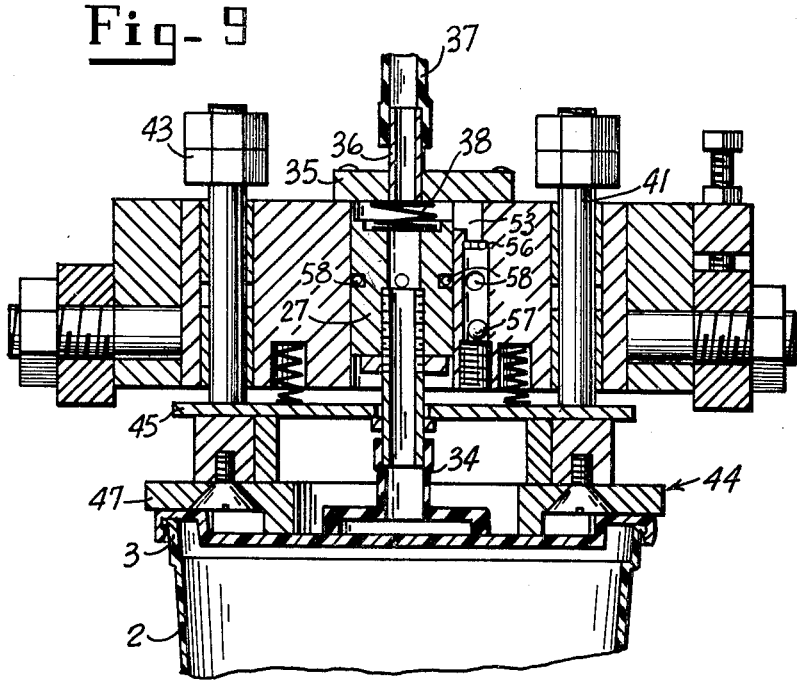

May 12, 1970  R. A. NEWPORT  3,511,025
CAPPING APPARATUS
Filed April 14, 1967  7 Sheets-Sheet 6

INVENTOR.
RICHARD A. NEWPORT
BY
Wells & St.John
ATTYS.

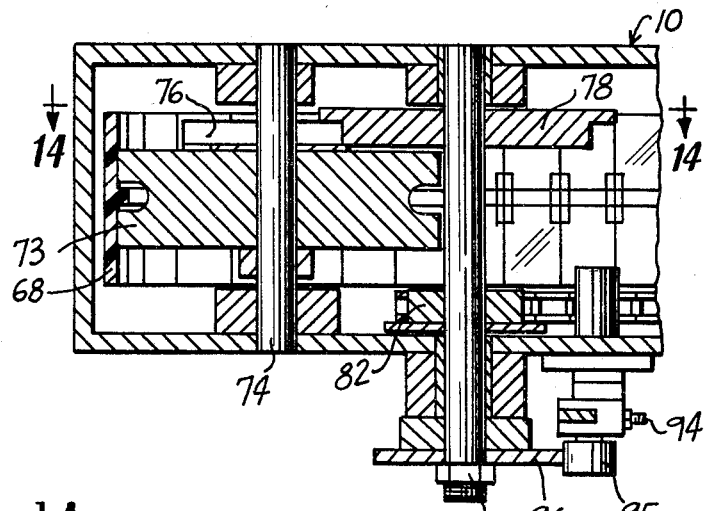
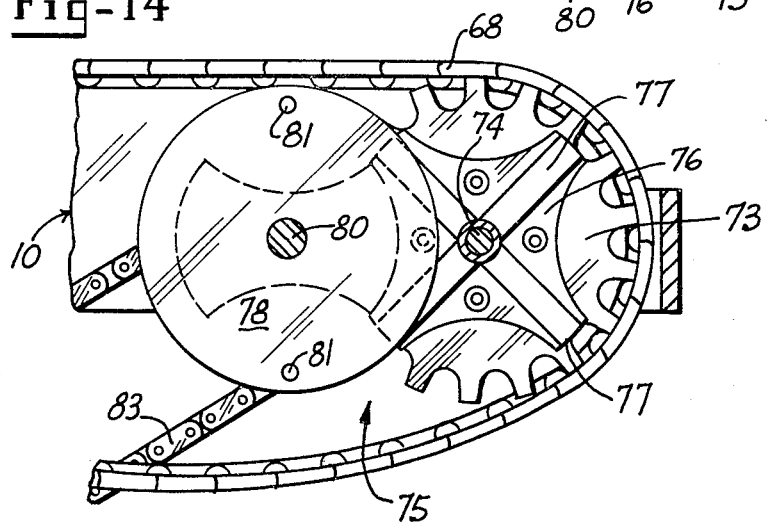
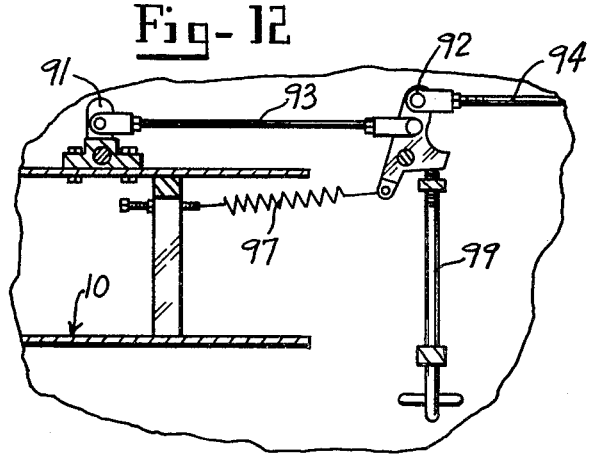

United States Patent Office 3,511,025
Patented May 12, 1970

3,511,025
CAPPING APPARATUS
Richard A. Newport, % Benewah Creamery, E. 408
Sprague Ave., Spokane, Wash. 99202
Filed Apr. 14, 1967, Ser. No. 631,033
Int. Cl. B65b 7/28
U.S. Cl. 53—307  9 Claims

ABSTRACT OF THE DISCLOSURE

An apparatus for applying closures to receptacles, particularly designed for applying caps to cylindrical cartons. A vacuum device receives the caps from a magzine and places each cap on a carton centered by a conveying and positioning apparatus.

Background of the invention

There has been a need in the dairy products industry for an efficient automatic apparatus for reliably, accurately and sanitarily placing caps on cottage cheese cartons that is simple in operation and economical to manufacture.

Accordingly, one of the principal objects of my invention is to provide an apparatus for applying closures to receptacles that is efficient, accurate and reliable in operation, simple in construction and economical to manufacture.

A further object of my invention is to provide a vacuum device that may be used in a capping apparatus that will not remove the material from a filled receptacle if the vacuum device does not carry a closure for applying to the receptacle.

An additional object of my invention is to provide a vacuum device that may be used in a capping apparatus that will only release a closure after it is applied to a receptacle.

A further object of my invention is to provide an inexpensive cam mechanism for rotating a vacuum device from a depending position to a substantially inverted position.

An additional object of my invention is to provide a capping apparatus that is easily adaptable and adjustable for use in handling and capping different sizes of receptacles.

Summary of the invention

My invention contemplates a capping apparatus for applying closures to receptacles in which an arm is pivotally mounted to a frame for moving an arm end in an arcuate path. A magazine containing a number of closures is aligned along a first axis tangentially to the arcuate path of the arm end. A conveyor system centers the receptacles one at a time along a second axis that is tangential to the arcuate path. A vacuum device is rotatably mounted to the arm end for seizing a closure from the magazine and applying the closure to the center receptacle. Cam facilities in cooperation with the pivoting arm rotate the cam device from a position facing the magazine to a position facing the centering receptacle. Furthermore, the vacuum device has a retractable plunger with a vacuum cup for translationallly moving a closure from the magazine and for releasing the closure when the receptacle is retracted a predetermined distance.

Brief description of the drawings

FIG. 1 is a perspective view of a receptacle with a closure adapted to enclose the receptacle;

FIG. 2 is a side elevation of a capping apparatus;

FIG. 3 is an enlarged fragmentary end view of the apparatus as seen from the left in FIG. 1;

FIG. 4 is a fragmentary sectional view taken along line 4—4 in FIG. 3 showing in phantom the placement of a closure on a receptacle;

FIG. 5 is a fragmentary sectional view taken along line 5—5 in FIG. 2;

FIG. 8 is a sectional view similar to FIG. 6, but showing the vacuum device with a closure facing a centered receptacle;

FIG. 9 is a view similar to FIG. 8 showing a closure being placed on the centered receptacle;

FIG. 12 is a sectional view taken along line 12—12 in FIG. 2;

FIG. 13 is a sectional view taken along line 13—13 in FIG. 11; and

FIG. 14 is a sectional view taken along line 14—14 in FIG. 13.

Description of the preferred embodiment

Figure 6:
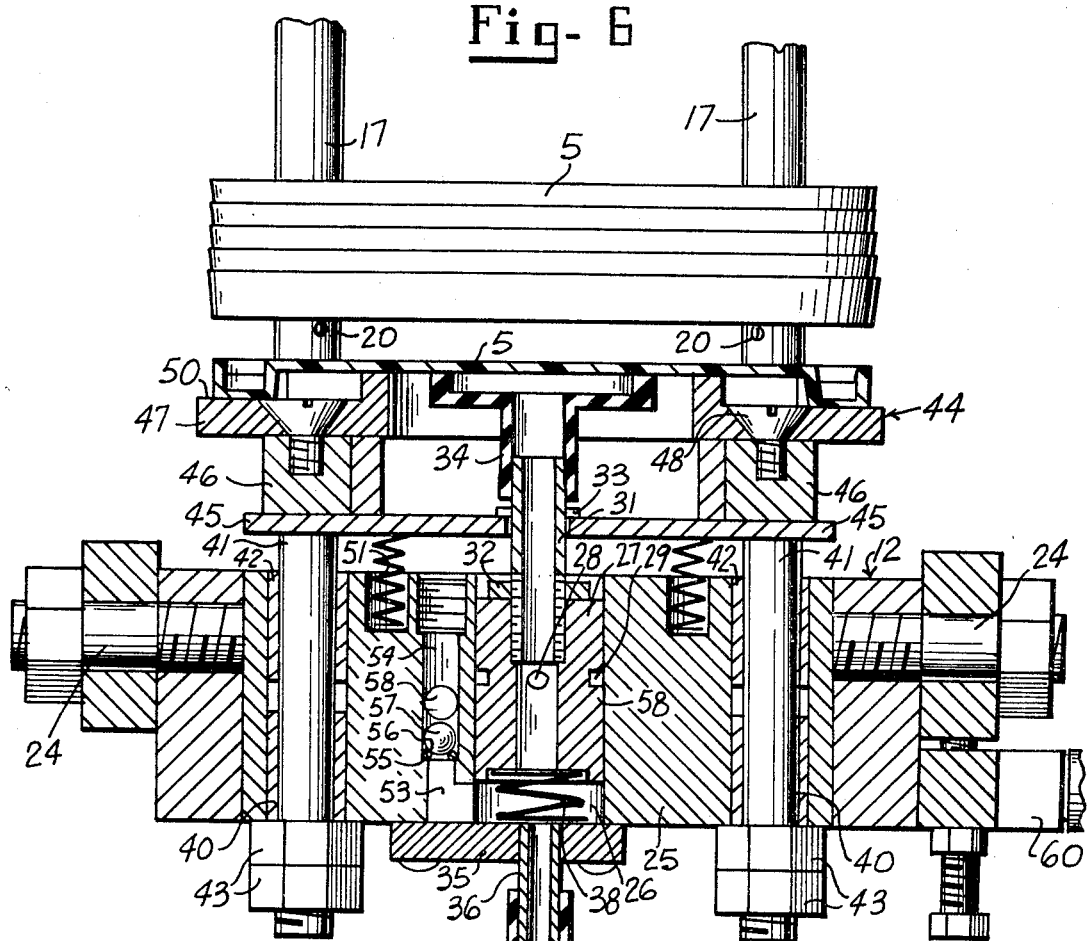
FIG. 6 is an enlarged fragmentary sectional view taken along line 6—6 in FIG. 4.
Figure 7:
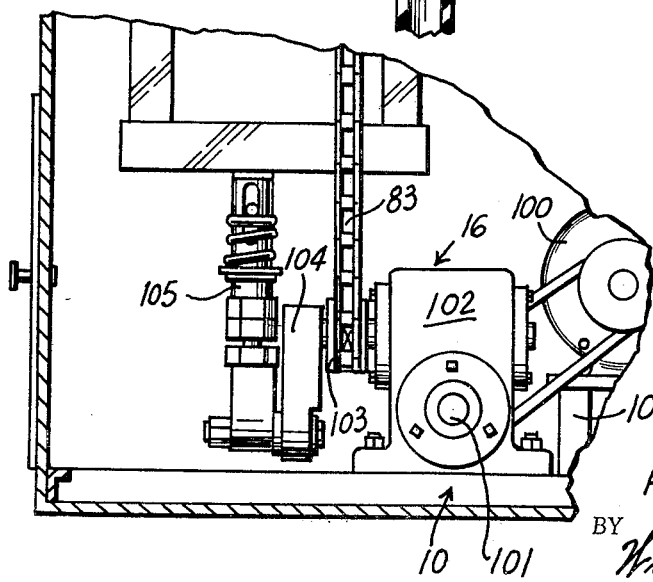
FIG. 7 is an enlarged fragmentary sectional view taken along line 7—7 in FIG. 2.
Figure 10:
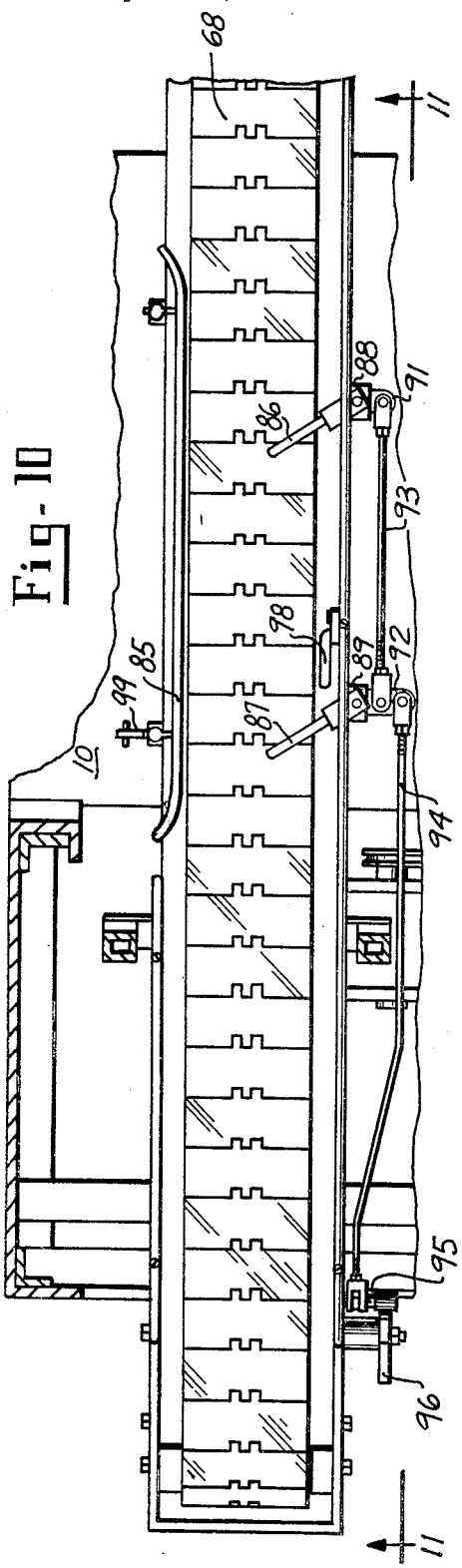
FIG. 10 is a sectional view taken on line 10—10 in FIG. 2.
Figure 11:
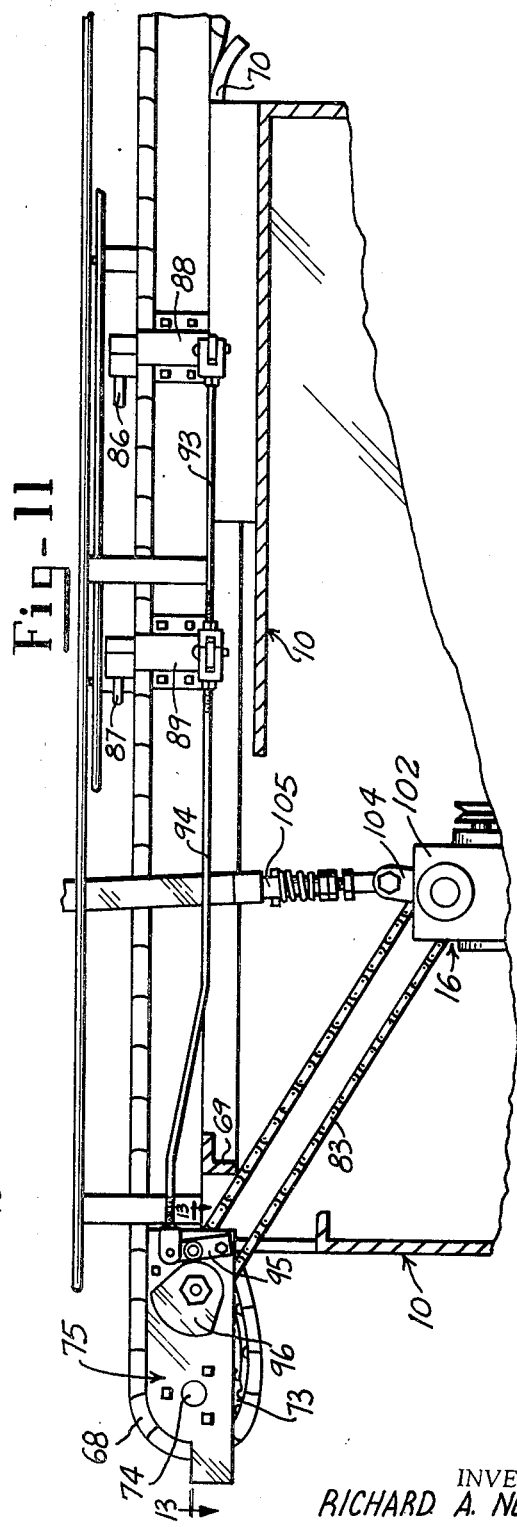
FIG. 11 is a sectional view taken along line 11—11 in FIG. 10.

Referring in more detail to the drawings there is shown in FIG. 1 a receptacle member 1 having a circular side wall 2 with an upwardly and outwardly extending rim 3. A circular closure 5 has a raised periphery 6 with a groove 7 formed therein for receiving the rim 3 to enclose the receptacle 1.

The capping apparatus for placing the closure 5 on the receptacle 1 is shown in FIG. 2. The apparatus comprises a general frame 10 on which a trunnion or arm 11 is pivotally mounted for movement from an inclined position to a substantally horizontal position. A vacuum device 12 is rotatably mounted to the end of the trunnion 11 for movement in an arcuate path. A magazine 13 is mounted to the frame 11 aligned along an axis A that is tangential to the arcuate path of the vacuum device 12. The magazine 13 is adapted to receive and yieldably hold a plurality of closures 5. A conveying and positioning means 14 is mounted to the frame 10 for conveying, positioning and centering receptacles one at a time along an axis B that is also tangential to the arcuate path of the vacuum device 12. A cam means 15 engages the vacuum device 12 for rotating the vacuum device 12 from a position facing the magazine 13 to a position facing an aligned receptacle positioned along axis B. A power unit 16 is connected to the trunnion 11 and the conveying and positioning means 14 for pivoting the trunnion 11 and driving the conveying and positioning means 14 in a predetermined sequence. The power unit 16 further drives a vacuum pump that supplies the vacuum pressure to the vacuum device 12.

The magazine 13 has a plurality of rods 17 that are radially spaced from and parallel to the axis A. The rods 17 are mounted to the frame 10 by a bracket 18. The bracket 18 is bolted to the general frame 10 (FIG. 4). Spacers 19 encircle the rod 17 at the upper and lower ends of the rods to give added structural support. Detents 20 are resiliently mounted in the lower portion of the rods 17 to provide a resilient restriction for the closures contained therein. Various size magazines may be readily interchanged to accommodate different size closures.

The trunnion or double arm 11 is pivotally mounted on a shaft 21 supported at the ends by bearings 22 bolted to the frame 10. The trunnion 11 is supported along the shaft at two points to provide stability to the trunnion and vacuum device as the trunnion is pivoted.

The purpose of the vacuum device 12 is to seize the lowermost closure from the magazine and to apply the closure to a receptacle. Although the vacuum device as shown is especially sized to handle receptacle closures, it may be used to handle various articles. The vacuum device 12 is rotatably mounted to shafts 24 that extend from the forked ends of the trunnion 11 (FIG. 3). The vacuum device comprises a head or body 25 which has a central bore 26 formed therein (FIG. 6). A hollow plunger 27 is movably mounted in the central bore 26. The plunger 27 has radial apertures 28 formed therethrough communicating with a circumferential groove 29 formed in the outer surface of the plunger 27. A pipe extension 31 is mounted to one end of the plunger 27 and extends from one end of the central bore 26. The extension 31 has a seal nut 32 threaded thereon for sealing the connection between the extension 31 and the plunger 27. An angular abutment 33 is mounted to the extension axially spaced from the seal nut 32. A resilient vacuum cup 34 is mounted to the outer end of extenstion 31 for engaging and securing a closure thereto. A plate 35 is mounted over the other end of the central bore 26 with a pipe 36 extending therefrom connected to a vacuum tube 37. A spring 38 is mounted between the plunger 27 and the plate 35 to bias the plunger 27 and extension 31 outwardly.

The head 25 further has diametrically opposite bores 40 formed therein parallel to the central bore 26. Rods 41 extend through the bores 40 and are movably supported by bushings 42. Nuts 43 are mounted on one end of the rods to limit the movement of the rods 41 in the bores 40. A facing ring 44 is attached to the other end of the rods 41 circumscribing the plunger extension 31.

The facing ring 44 has a stop plate 45 with an aperture formed therein circumscribing the extension 31 for limiting the outward movement of the plunger 27 as the plate 45 is engaged by the seal nut 32 and for restricting the inward movement of the plunger 27 when the angular abutment 33 engages the plate 45. The plate 45 has a circular spacer 46 mounted thereon with a face plate 47 attached thereto for engaging and supporting the outer circumference of the closure 5. The face plate 47 is secured to the circular spacer 46 by screws 48. The face plate 47 has a recessed surface 50 which is formed to support the raised periphery 6 of the closure 5. Springs 51 are mounted between the plate 45 and the head 25 for biasing the facing ring 44 from the head 25.

A cylindrical vent aperture 53 is formed in the head 25 communicating with the atmosphere and the central bore 26. A valve means or more particularly a one-way ball valve is constructed in the aperture 53. A counter bore 54 formed in the cylindrical aperture 53 produces a shoulder 55. A seal ring 56 is positioned against the shoulder 55. A ball 57 is freely positioned in the counter bore 54 for seating against the seal ring 56 to prevent the venting of vacuum pressure from the central bore 26 and vacuum cup 34. When the vacuum device 12 is facing the magazine 11 the ball 57 falls by gravity into engagement with the seal ring 56.

A second valve means or venting system is constructed within the vacuum device 12 that is responsive to the positioning of the plunger 27. Specifically a passageway 58 is formed in the housing head 25 passing from the central bore 26 to the counterbore 54. The passageway 58 is axially spaced from the radial apertures 28 of the plunger 27 so that when the plunger 27 is retracted a predetermined distance, the radial apertures 27 are aligned with the passageway 58 to vent the vacuum in the vacuum cup 34 and vent aperture 53.

A wrist pin 60 is mounted to the head 25 offset a predetermined distance from the shafts 24 for enabling the cam means 15 to rotate the vacuum device 12.

Stops 59a and 59b are adjustably mounted to the vacuum head 25 for limiting the relative rotation of the vacuum device 12 about the end of the trunnion to approximately a 180 degree arch. As shown in FIG. 4, when the vacuum device is rotated to the substantially inverted position the stop 59b abuts the trunnion 11 to prevent further counterclockwise rotation and to align the axis of the vacuum device perpendicular to the trunnion. When the vacuum device is rotated clockwise, as the trunnion moves down in the return stroke, the stop 59a abuts the trunnion 11 to prevent further clockwise rotation and to align the axis of the vacuum device perpendicular to the trunnion.

The cam means 15 comprises a straight line cam 61 that is affixed to a shaft 62 that it rotatably mounted to the frame 10. The cam 61 has a straight line cam groove 63 formed therein for receiving the wrist pin 60 an for guiding the wrist pin to rotate the vacuum device as it is being pivoted by the trunnion. A torsion spring 64 (FIG. 5) is mounted about the shaft 62 for biasing the cam 61 against a stop 65. The stop 65 is adjustably mounted to the frame 10 for limiting the counterclockwise rotation of the cam 61 as viewed in FIGS. 2 and 4 and to define a normal orientation for the cam 61 along a line that intersects the arcuate path of the vacuum device. A stop 66 is mounted to the frame a predetermined distance from the cam for limiting the clockwise rotation of the cam 61 to the predetermined distance.

The conveying and positioning means 14 comprises a continuous conveyor 68 that is mounted on angle irons 69 that are mounted to the frame 10. A horizontal plate 70 is mounted to the frame 10 for supporting the return flight of the conveyor 68. The conveyor 68 is supported between an idler sprocket 71 attached to a shaft 72 and a drive sprocket 73 to a shaft 74. The sprocket 73 and the shaft 74 are incrementally rotated by a geneva movement 75.

The geneva movement 75 has a face plate 76 attached to the conveyor sprocket 73. The face plate 76 has four radial grooves 77 spaced 90 degrees about the face plate 76. A disc 78 is mounted on a shaft 80 that is rotatably supported on the frame 10 adjacent the shaft 74. Two diametrically opposed wrist pins 81 are mounted to the disc 78. As the disc 78 rotates, the wrist pins 81 intermittently enter the radial grooves 77 to turn the conveyor sprocket 73. Since there are four radial grooves and two wrist pins, the drive sprocket rotates a quarter of a revolution for every half revolution of the disc 78. The shaft 80 and the disc 78 are rotated by a sprocket 82 fixed to the shaft 80 which is driven by a chain 83.

An adjustable guide 85 is positioned adjacent the conveyor 68 for guiding the receptacles as they move along the conveyor. Gates or projections 86 and 87 are mounted to the frame 10 spaced one from the other along the other side of the conveyor from the adjustable guide 85. The gates 86 and 87 are pivotally mounted on pivot boxes 88 and 89 respectively for swinging into the path of the moving receptacles at an inclined angle to the longitudinal axis of the conveyor 68. Gate 86 has a pivot arm 91 and gate 87 has a pivot arm 92. A connecting rod 93 extends between the pivot arms 91 and 92 to translate movement one to the other. A pivot rod 94 is connected between the pivot arm 92 and a cam follower 95 which is rotatably mounted to the frame 10. The cam follower 95 is actuated by an angularly adjustable cam 96 attached to shaft 80. A spring 97 is connected between the pivot arm 92 and the frame 10 for resiliently urging the gates 86 and 87 from the path of the receptacles (FIG. 12). Furthermore, the spring 97 urges the cam follower 95 against the cam 96. An adjustable stop 99 is mounted adjacent the pivot arm 92 for limiting the movement of the pivot arm 92 to set the angle at which the gates 85 and 86 project into the path of the receptacles. The stop 99 is readily adjustable so that the projection angle of the gates 85 and 86 are easily varied to accommodate different size receptacles.

A deflector 98 is mounted to the angle iron 69 and extends along the side of the conveyor to guide the receptacles to gate 87. The deflector 98 is particularly effective when large receptacles are being handled on the conveyor system.

The drive unit 16 comprises a motor 100 mounted to the frame 10 that is connected to a vacuum pump 101 that supplies the vacuum pressure to the vacuum device 12 through vacuum tube 47. The motor 100 further drives a gear reduction unit 102 that rotates a sprocket 103 for moving the chain 83. The reduction unit 102 also rotates a crank 104 that reciprocates a rod 105 connected to the trunnion 11.

In operation, the capping apparatus during each cycle of operation places one closure on a filled receptacle. During each cycle, the power unit 16 rotates the shaft 80 one revolution and pivots the vacuum device 12 from the conveyor 68 to the magazine 13 to seize a closure and then back to the conveyor to apply the closure to a receptacle. One revolution of shaft 80 also sequentially rotates the drive sprocket 73 one-half revolution to incrementally move the receptacles forward twice along conveyor 68. During one revolution of the shaft 80, the cam 96 moves against the cam follower 95 to pivot the gates 86 and 87 into the path of the moving receptacles to space the receptacles and to align the leading receptacle along axis B.

Initially, the vacuum device 12 is in the down position facing the conveyor 68 and the gates 86 and 87 are projecting into the path of the receptacle with the leading receptacle engaging the forward gate 86. The cam 96 is rotated to the dwell position enabling the gates 87 and 88 to be pivoted out of the path of the receptacles to permit the receptacles to incrementally move forward, with the leading receptacle moving past gate 86. Further rotation of cam 96 moves the cam follower 95 to pivot gate 87 into the path of the leading receptacle and gate 86 into the path of the succeeding receptacle. During the second incremental movement of the conveyor 68, the leading receptacle is moved against the rear gate 87 and the second receptacle is moved against the forward gate 86. Since the projecting gate 87 is inclined to the path of the receptacle movement, the leading receptacle moves transversely along the gate 87 against the guide 85 which is set to center the receptacle along the axis B.

If different size receptacles are used, proper longitudinal and transverse positioning of the receptacles on the conveyor may be readily and easily accomplished by adjusting the guide 85 and the adjustable stop 99. The timing of the movement of the gates 86 and 87 into the path of the receptacles with respect to the movement of the reciptacles is adjusted by angularly moving the cam 96 on the shaft 80. It is preferable to position the cam 96 on the shaft 80 so that the conveyor 68 continues to move when the gates 86 and 87 are projecting into the path of receptacles to make sure that the leading receptacle is moved against the gate 87 and the guide 85.

As the vacuum device 12 is pivoted upwardly along the arcuate path, a movement is produced by the wrist pin 60 and the cam 61 to rotate the vacuum device about the shafts 24 into facing relationship to the magazine 13. The initial upward movement of the vacuum device is substantially translational along the tangential axis B, thus permitting the vacuum device to move from the horizontal plane of the receptacles before being rotated. When the vacuum device 12 is rotated to the magazine 13, the wrist pin 60 moves upwardly along the straight line cam groove 63. When the vacuum device 12 has rotated 180 degrees with respect to the trunning end, the stop 59b abuts the trunnion 11 to stop further rotation of the vacuum device so that the vacuum device is aligned tangential to the arcuate path of the trunnion end. At this point the cam follower 60 urges the cam 61 to rotate against the torsion spring 64 to permit the continual arcuate pivotal movement of the trunnion 11.

As the closure covers the opening of the vacuum cup 34, the vacuum pressure in the plunger 27 and the central bore 26 increases to move the plunger 27 inwardly to pull the engaged closure from the magazine 13 and into engagement with the facing ring 44 with the raised periphery 6 of the closure seated against the recessed surface 50. Thus it may be said that vacuum device 12 itself translationally pulls the closure from the magazine without the assistance of the downward movement of the trunnion.

When the vacuum device 12 is facing the magazine 11, the ball 57 rests on the ring seal 56 (see FIG. 6). The increase in vacuum pressure seats the ball 57 against the ring seal 56.

As the vacuum device 12 is rotated downwardly the vacuum pressure is sufficient to hold the ball against the ring seal 56 to maintain the vacuum pressure in the plunger 27 to hold the closure. If the plastic vacuum cup 37 does not engage a closure the vacuum pressure in the plunger is not sufficient to hold the ball against the ring seal 56 when the vacuum device 12 is inverted, thereby venting the vacuum pressure. Thus, if the vacuum device does not have a closure over the vacuum cup 34 the cup will not suck the material such as cottage cheese from the filled aligned receptacle.

As the trunnion initially pivots the vacuum device 12 downwardly, the cam follower 60 permits the cam 61 to rotate back against the stop 65. Continued downward movement of the trunnion produces a moment between the cam follower 60 and the center shafts 24 to rotate the vacuum device clockwise as viewed in FIGS. 1 and 4. As the trunnion moves down the cam follower 60 slides downward in the cam groove 63. When the vacuum device 12 rotates 180 degrees the stop 59a abuts the trunnion 11 to prevent further rotational movement and to align the vacuum device in a tengential orientation. At the point the cam follower urges the cam 61 to rotate against the torsion spring to enable the continued movement of the trunnion without binding the cam follower 60 in the cam groove 63. Thus it may be said that the combination of the rotatable cam 61 having a straight line cam groove 63, the torsion spring 64 and the stop 65 constitute a cam means that rotates the vacuum device 12 about the trunnion end.

The last few degrees of movement of the trunnion moves the vacuum device 12 substantially translationally along axis B to accurately apply the attached closure to the receptable, as is shown in FIG. 9. As the vacuum device 12 moves downwardly applying the closure to the receptacle, the facing ring 44 is forced against the springs 51 to enable the plunger to further retract to align the radial apertures 28 with the passageway 58 to vent the vacuum pressure in the plunger, thus releasing the closure.

If a receptacle is not positioned below the vacuum device, the vacuum device retains the closure for movement through the next cycle.

It is understood that the above described embodiment is simply illustrative of an application of the principles of my invention. Numerous other arrangements may be readily devised by those skilled in the art which will embody the principles of my invention and fall within the spirit and scope thereof. Therefore, only the following claims are intended to define my invention.

What I claim is:

1. In a machine for applying closures to receptacles:
   (a) a frame;
   (b) an arm pivotally mounted to the frame for moving the end thereof in an arcuate path;
   (c) a closure magazine mounted to the frame for centering the closures successively along a first axis tangential to the arcuate path;
   (d) a conveying and positioning means for centering the receptacles one at a time along a second axis tangential to the arcuate path;

(e) a vacuum device rotatably mounted to the arm end for securing a closure from a magazine and applying the closure to a receptacle centered along the second axis;

(f) straight line rotatable cam means engaging the vacuum device for rotating the vacuum device from a position facing the magazine to a position facing the centered receptacle as the arm end is moved in an arcuate path; and (g) a reciprocating drive rod centered to the arm for pivoting the arm.

2. The combination in accordance with claim 1 wherein the vacuum device has a vacuum head with a retractable plunger extending therefrom for engaging a closure positioned in the magazine and for translationally moving the engaged enclosure from the magazine.

3. The combination in accordance with claim 2 wherein the vacuum head has a valve means for venting the vacuum pressure when the plunger is retracted a predetermined distance to release the closure.

4. The combination in accordance with claim 1 wherein the vacuum device has an offset wrist pin and wherein the rotatable cam means has a straight line groove for receiving and guiding the wrist pin to rotate the vacuum device as the arm is rotated.

5. A combination in accordance with claim 4 wherein the cam means is rotatably mounted and the combination further comprises resilient means engaging the cam means for urging the cam means against a stop.

6. The combination in accordance with claim 4 wherein the conveying and positioning means comprises:
(a) a conveyor for moving receptacles;
(b) a stationary guide mounted longitudinally adjacent the conveyor;
(c) pivotable projections spaced along the conveyor for pivoting into the path of the receptacles to space receptacles and to guide the moving receptacles against the stationary guides to center the receptacles along the second axis; and
(d) drive means for driving the conveyor and for pivoting the inclined projectors into the path of the receptacles.

7. The combination in accordance with claim 3 wherein the vacuum device has a second valve means for venting the vacuum pressure if the plunger does not engage a closure when the vacuum devices faces the magazine.

8. In combination with a processing station and a conveyor system for centering cylindrical containers with respect to the processing station, said conveyor system including:
a movable conveying surface for receiving the containers;
a longitudinal guide mounted along one side of the conveying surface;
longitudinally spaced projections pivotally mounted along the other side of the conveying surface and opposing the longitudinal guide for arcuate movements from open positions to closed positions projecting at acute angles into the path of the containers;
a drive means operably connected to the conveying surface and the pivotable projections for pivoting the projections to the closed position and for intermittently moving the conveying surface to move the containers against the angularly posiitoned projections to wedge the containers between the projections and longitudinal guide to center the containers;
said conveying system being adjustable to handle different sized containers in that the longitudinal guide is transversely adjustable, the projections are angularly adjustable and the drive means includes intermediate means adjustable to vary the timing of the intermittent movement of the conveying surface with respect to the pivoting of the projections.

9. In combination with a processing station that applies closures to cylindrical containers and a conveyor system for centering the containers with respect to the processing station, wherein the processing station has a vacuum device for receiving closures from a magazine and for applying the closures to the centered container, said conveyor system including:
a movable conveying surface for receiving the containers;
a longitudinal guide mounted along one side of the conveying surface;
longitudinally spaced projections pivotally mounted along the other side of the conveying surface and opposing the longitudinal guide for arcuate movements from open positions to closed positons projecting at acute angles into the path of the containers;
a drive means operably connected to the conveying surface and the pivotable projects for pivoting the projections to the closed position and for moving the conveying surface to move the containers against the angularly positioned projections to wedge the containers between the projections and the longitudinal guide to center the containers.

References Cited

UNITED STATES PATENTS

| | | | |
|---|---|---|---|
| 2,434,952 | 1/1948 | Nordquist | 53—367 |
| 2,849,847 | 9/1958 | Anderson | 221—211 X |
| 3,293,823 | 12/1966 | Anderson | 53—307 X |

TRAVIS S. McGEHEE, Primary Examiner

U.S. Cl. X.R.
53—367; 221—63